Sept. 6, 1955     B. T. HENSGEN ET AL     2,717,212
METHOD AND APPARATUS FOR CONTINUOUS CHEESE MANUFACTURE
Filed April 20, 1949     5 Sheets-Sheet 1
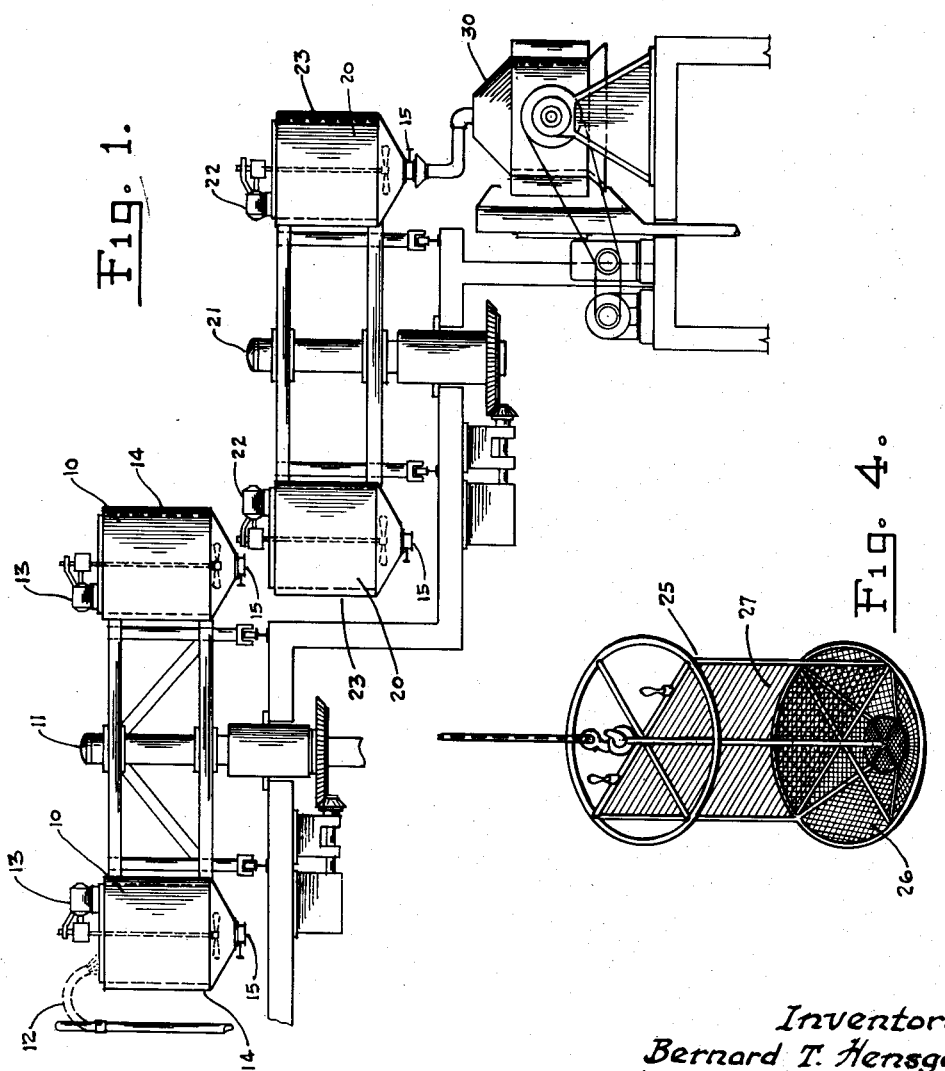
Inventors
Bernard T. Hensgen
Johan C. Vanden Bosch
Albrecht M. Lederer
Peirce M. Wood
By R.G. Story
Attorney

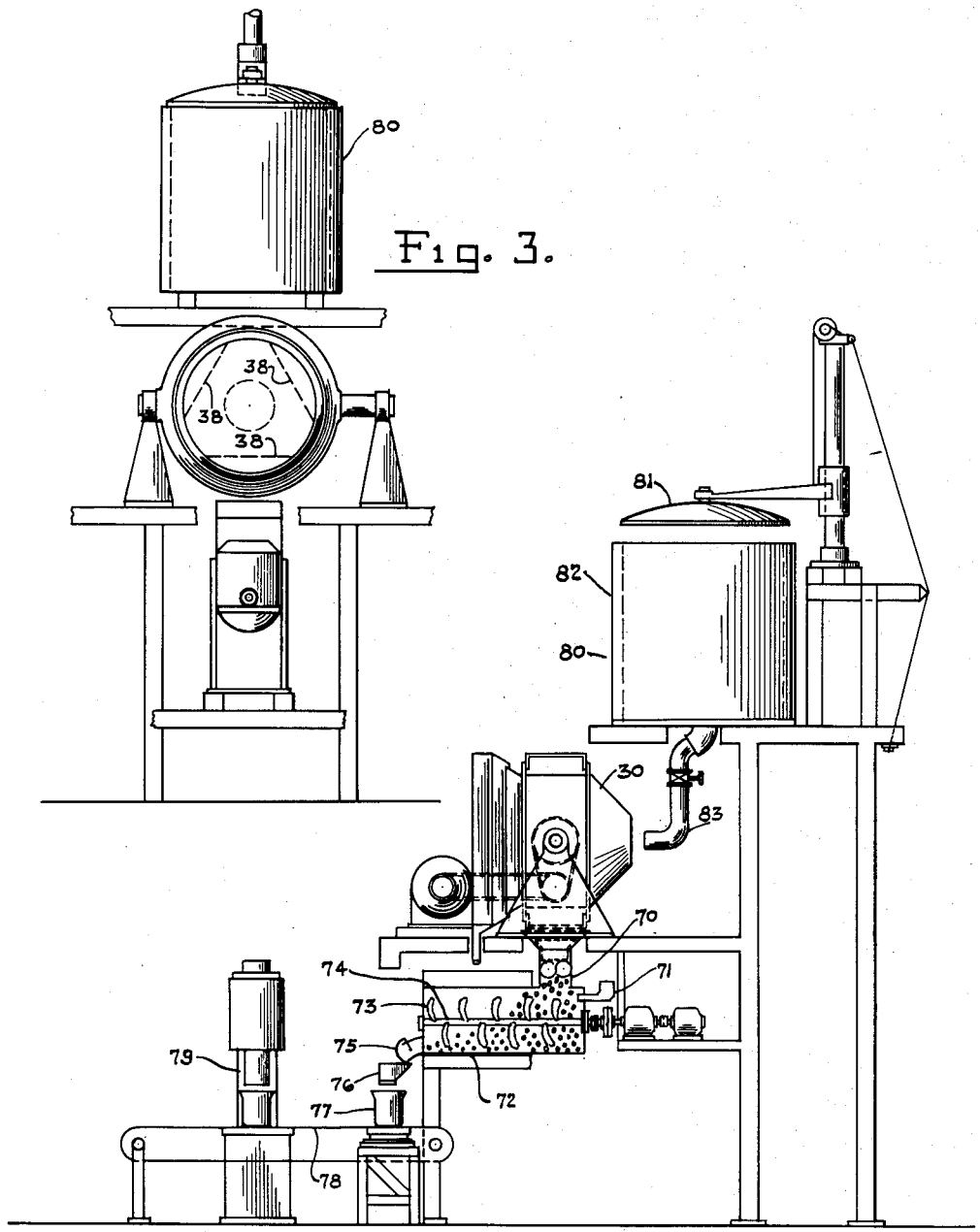

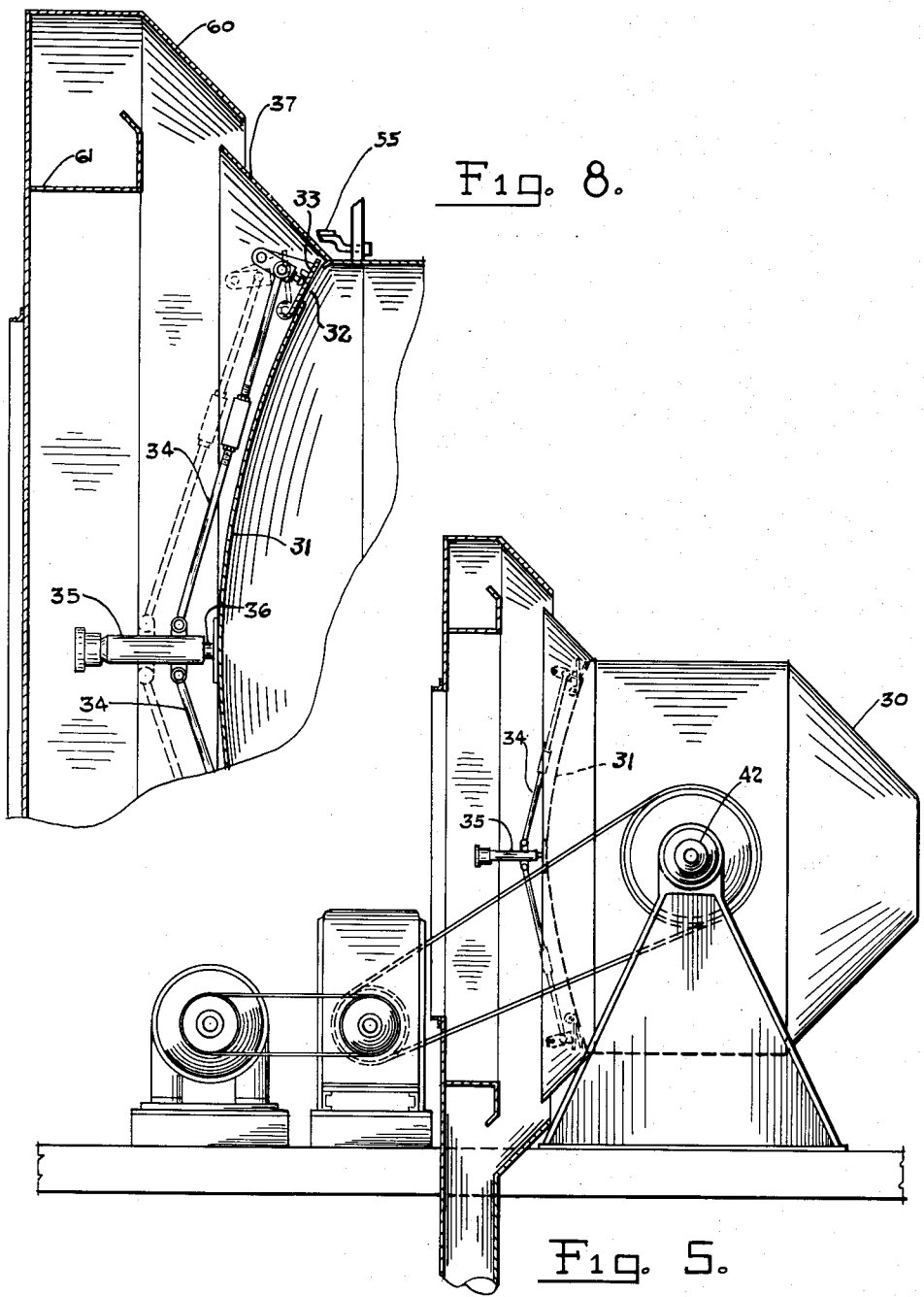

Sept. 6, 1955 B. T. HENSGEN ET AL 2,717,212
METHOD AND APPARATUS FOR CONTINUOUS CHEESE MANUFACTURE
Filed April 20, 1949 5 Sheets-Sheet 4

Inventors
Bernard T. Hensgen
Johan C. Vanden Bosch
Albrecht M. Lederer
Peirce M. Wood
By R.H. Story
Attorney

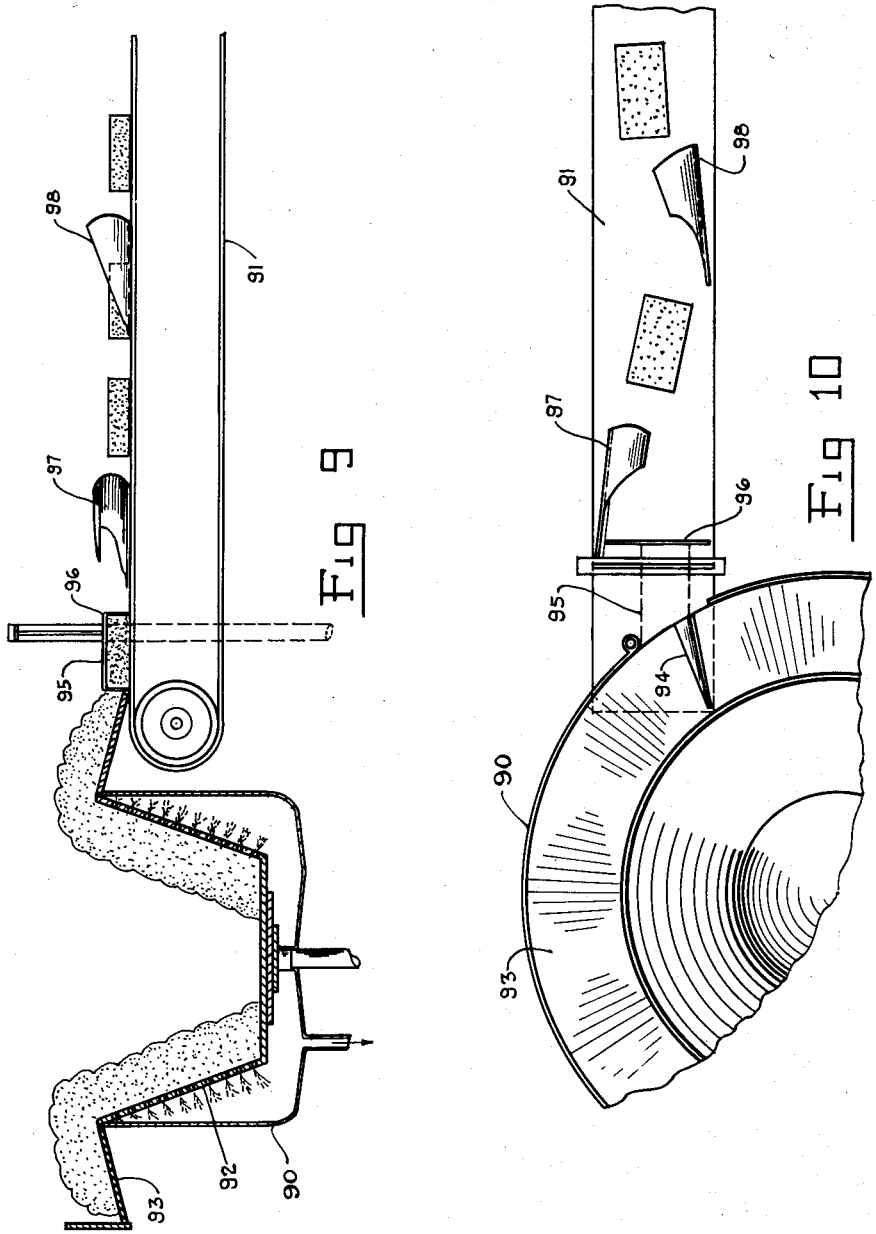

United States Patent Office 2,717,212
Patented Sept. 6, 1955

2,717,212

METHOD AND APPARATUS FOR CONTINUOUS CHEESE MANUFACTURE

Bernard T. Henssgen and Johan C. Vanden Bosch, Chicago, Ill., Albrecht M. Lederer, New York, and Peirce M. Wood, Mamaroneck, N. Y., assignors to Swift & Company, Chicago, Ill., a corporation of Illinois Application April 20, 1949, Serial No. 88,676

7 Claims. (Cl. 99—116)

This invention relates to the manufacture of cheese and more particularly to a machine in which the curd may be coagulated and continuously processed to produce a cheese product.

It is an object of this invention to provide a machine adapted to perform all of the necessary steps required for the treatment of milk to produce a green cheese product.

It is another object of this invention to provide a machine in which the curd-coagulating step of a cheese-making process may be performed.

It is another object of this invention to provide an improved machine in which the separation of the curd from the whey may be accomplished.

It is another object of this invention to provide a machine in which the curd-cheddaring operation may be performed.

It is another object of this invention to provide a machine in which the coagulation of the curd, the separation of the whey, and the cheddaring steps may be performed.

It is another object of this invention to provide a machine in which the coagulating and cutting of the curd may be performed and thereafter the whey can be separated from the curd, and the cheddaring performed mechanically.

It is another object of this invention to provide a machine in which proper cheddaring and salting of the curd can be performed.

It is another object of this invention to provide a machine in which the cheddaring of the curd, the salting thereof, and the filling of the treated curd into hoops, can be accomplished.

It is another object of this invention to provide a machine in which a curd can be coagulated, cooked, cut, and the whey separated therefrom, the curd cheddared, salted, and filled into hoops.

It is another object of this invention to provide a machine adapted to produce a curd from which cheese may be made, the curd of succeeding batches having moisture content and improved texture as compared with all methods heretofore known for preparing such curd.

It is another object of this invention to provide a machine for mechanically molding a cheese curd to produce a green cheese.

Other objects will appear from the specification below.

In the drawings:

Figure 1 is a diagrammatic side elevation of the preferred assembly forming the subject of this invention;

Figure 2 is a side elevation of an alternate form of an apparatus embodying the subject of this invention;

Figure 3 is a front end elevation of the apparatus shown in Figure 2;

Figure 4 is an enlarged perspective view of a curd-cutting means;

Figure 5 is a sectional side elevation of a centrifugal whey-separating apparatus;

Figure 8 is a sectional side elevation of the basket and whey-collecting means showing in detail a valve mechanism which may be opened to permit the whey to flow out of the centrifuge and away from the curd;

Figure 9 is a diagrammatic side elevation of an alternate type of centrifuge and cheddaring means; and Figure 10 is a plan view of the apparatus shown in Figure 9.

Figure 7:
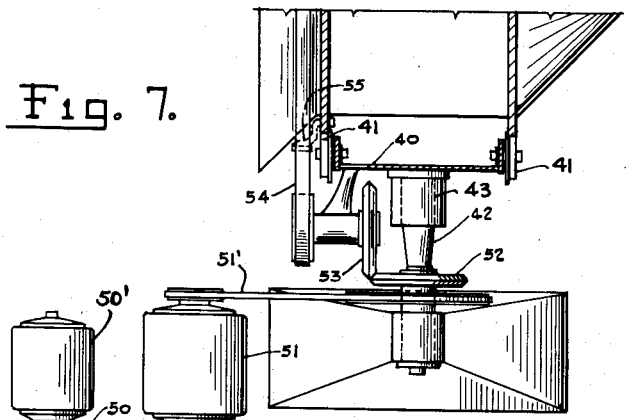
Figure 7 is a sectional plan view of the power drive for the centrifuge and the mounting structure for the rotating basket of the centrifuge.

In the usual process for manufacturing cheddar cheese and the like, warm milk is provided, which milk may be either raw or pasteurized and is sometimes the whole milk but more generally is a milk product having its fat content adjusted to fall within a certain range. In order to develop the best conditions for producing a curd, the warm milk is subjected to the action of harmless lactic acid producing bacteria or other starter which may be present in such milk or which may be added thereto. Sufficient rennet or other coagulating materials may be then added to coagulate the curd so that upon being left quiescent for a short time the batch of milk sets to a semisolid mass. The mass is then cut, stirred, and heated while being continuously and gently stirred so as to promote the separation of whey from the curd, the curd shrinking somewhat on being heated to promote the separation of the whey. The whey is then drained off, and the curd cubes coalesce into a cohesive mass. Then the curd is cut into small slabs which are cheddared by being piled on each other, and the slabs are turned from time to time so as to promote the drainage of whey while a desired acidity is being developed in the curd. This production of the proper initial and final acidity in the curd is important in order to produce the best curd, to assist in the expulsion of whey, to encourage the fusing of the curd to activate the peptic enzymes, and to protect the curd against certain harmful bacteria.

After the cheddaring step has been completed, the slabs are then cut into smaller pieces, and the curd may be salted, stirred, and further drained, if necessary, and thereafter placed into forms or hoops until the curd takes a permanent set. Then the hoops may be removed and the molded curd coated with paraffin and set to age under proper conditions of temperature and humidity until the desired texture and flavor develop. The finished cheese product is then ready to be marketed.

In the past it has been the practice to run a batch of milk into a large vat wherein most all of the above-described operations are performed. With the exception of a power driven cutting knife and stirring means which are operative during the heating or cooking step, all of the above-described operations have been heretofore performed manually, and thus the expenditure of a considerable time and effort on the part of a skilled cheese maker is required to complete the curd formation, whey separation, cheddaring, salting, and hooping operations. The present invention has been made in order to eliminate all of this manual labor. It is to be noted also that the machine may be operated by relatively unskilled labor in the completion of the manufacture of cheese, including the delicate cheddaring process, and it facilitates the production of a curd having a uniform moisture and texture which makes up into a uniformly good type of cheese product.

The present invention is an improvement on all of the known prior art methods for the making of cheese and provides a machine which speeds up the cheese-making process, including the coagulation of the curd and the cutting and separation of whey therefrom. The machine is adapted to also perform the cheddaring process, the salting of the cheese curd, and its delivery into proper hoops or forms so that a permanent set can be produced whereupon the curd can be set aside for proper curing and aging.

The preferred form of the invention will be described in connection with the production of a typical cheese, such as American cheddar cheese, and as shown in Figure 1, the machine may take the form of a series of movable vats 10 mounted to turn about a central support 11. The heated vats 10 are delivered past a milk-filling spout 12, and to make a cheddar cheese, the vats are filled with suitable raw or pasteurized milk having a fat content of about 3 to 4 per cent. A suitable lactic acid producing bacteria starter of the Streptococcus lactic type is added along with the milk or, in the case of raw milk, sometimes the natural bacteria present in the milk may be developed by merely warming the milk to produce lactic acid until the milk has an acid concentration of from 0.17 to 0.20 per cent. Other associated organisms may be used with Streptococcus lactic starter, such as Streptococcus citrovorus and para citrovorus or Streptococcus cremoris. When a cheese other than the cheddar type is to be made, starters such as Lactobacillus, acidophilus, or bulgaricus may be used. Also, at this point rennin or other suitable coagulants, such as a mixture of rennin and calcium chloride, may be added with a coloring matter, if required, and the loaded vat 10 is slowly indexed from the milk-filling spout 12 around to the emptying station on the right-hand side of the machine as shown in Figure 1.

Suitable driven stirring means, as the electric motor-driven stirrer 13, are preferably mounted in association with each vat 10 whereby the starter, color, and coagulating ingredients may be distributed thoroughly throughout the mass of the milk while the acid begins to develop. Each of the vats 10 is provided with a heating jacket 14 so that the milk is maintained at a temperature of about 84° to 88° F. to promote a proper coagulation within the milk; and as soon as a uniform mixture of all the ingredients has been obtained, it is emptied from vat 10 into a similarly-constructed vat 20 disposed under the valve-controlled outlet 15 of vat 10.

The milk is delivered into one of a series of vats 20 and is allowed to remain in the vats 20 as they move from the filling position to the emptying position shown at the right-hand side of Figure 1. As with vats 10, the vats 20 are mounted to rotate about a support 21, and each of the vats 20 has a stirring means 22 mounted thereon to be carried around with the vat. The stirrers may be provided with hinges so that they may be cleared away for the charge. The stirring means 22 is not energized during the initial movement of tank 20; and under the influence of heat which is continuously supplied by a heating fluid circulated in jacket 23, a curd is produced as the acid development and coagulation processes proceed. After about 20 minutes and when the milk has taken a set, the curd is cut into one-half inch cubes by means of a knife element 25 such as that shown in enlarged form in Figure 4.

The knife 25 is preferably mounted on a suitable frame which just fits within the cylindrical vat 23; and at its lower end, the frame of the knife is provided with a series of interlaced elements, such as wires 26, which cut the curd into squares as the knife element is lowered into the vat. Knife 25 also carries a series of horizontally arranged cutting elements 27 which cut the curd in horizontal planes when the knife 25 is rotated within the vat. Thus, when the knife passes into the vat and is given one rotation, the curds are first cut into long square rods and thereafter the rods are cut up into small cubical blocks by cutting elements 27 as the cutter is rotated.

After the curd has been coagulated and cut, the stirring means 22 is energized to slowly and gently agitate the cut curd while the temperature of the mass is raised to from 98° to about 104° F. to encourage the separation of whey by contacting the curd with the heat; and during this heating or cooking step, which takes about 30 to 40 minutes, a desired acid condition develops within the curd by reason of the bacterial action. This acid development also aids in the separation of the whey.

By the time the vat 20 has been delivered to its emptying station, the curd has been conditioned for proper separation from the whey and for performance of the cheddaring operation. For this purpose, the curd is delivered into a centrifuge 30 which is preferably supported so that it may be swung in its mounting to turn its axis of rotation from a position in a horizontal plane to a position in a vertical plane or any angle above or below the horizontal.

The construction of the centrifuge is shown in more detail in Figures 5, 6, 7, and 8; and referring to these figures, it is seen that the centrifuge preferably takes the form of a rotatably-mounted basket to receive the curd and whey as they are emptied into the centrifuge, the basket having a bottom wall 31 which is generally imperforate but which is provided with a series of appertures 32 around the periphery thereof.

The apertures 32 are adapted to be closed when the basket is stationary by flap valves 33 which are normally held closed by links 34 that connect to a movable slider 35 mounted on the bearing pin 36, the pin being fixed to the bottom 31 of the basket. The flap valves 33 may be opened by moving slider 35 to the left as shown in Figure 8, and this movement may be accomplished either manually or by suitable governor control responsive to the speed of rotation of the centrifuge.

As above indicated, the basket of the centrifuge is mounted so that it may be turned to rotate about an axis disposed in any plane, and for this purpose the basket 30 is rotatably mounted within the ring support 40 on suitable bearings 41. The ring 40 is in turn carried on a pair of diametrically-disposed stub axles 42, the stub axles each being carried in bearing mountings 43. With this construction the ring 40 may be turned to any desired position. Thus, the basket may be turned so that its mouth faces upwardly while it is being loaded and the centrifuging step is being performed, or the basket can be turned to a horizontal position before or during the performance of the centrifugal separation of the whey from the curd. Then, for the purpose of unloading the basket, the ring may be turned so that the axis of rotation of the basket can be depressed below the horizontal so that the curds will fall out of the mouth thereof.

The ring 40 may be provided with any suitable manual control for the proper positioning of the basket. Also, any conventional power-driving means may be associated with the basket 30 and the ring 40 such as is shown more particularly in Figure 7 wherein a suitable pulley drive 50 connects a prime mover 50' to a gear reducer 51 which, through a pulley 51', drives the gear 52. This gear meshes with another gear 53 that drives pulley belt 54 which runs over a suitable track 55 formed around the periphery of the basket. The gear 52 and its pulley drive are rotatably mounted on one of the stub axles 42 of the ring 40, and the gear 53 and its associated axle and pulley drive are carried in a bearing support fixed to the ring 40. With this drive, the basket 30 may be rotated when the basket is positioned in any angle from substantially the vertical down to the horizontal or lower.

After the curd and the whey have been emptied into the centrifuge, rotation of the basket may be begun, and the curd and the whey flow outwardly against the outer wall of the basket as the speed of rotation increases. The curd may be charged to the centrifuge while rotating, if desired. When a basket having an average diameter of 48 inches is driven at about 40 to 75 R. P. M., the bulk of the whey will rapidly flow off as soon as the flap valves 33 are opened, and this separation may take place while the basket is rotating about any desired axis.

Preferably, the whey is separated from the curd while the basket is rotated about a horizontal axis; and, as best shown in Figure 8, when the whey flows out of the apertures 32, it is caught by the flaring collar 37 which surrounds the bottom of the basket, and the whey is forcibly thrown into a hood 60 which surrounds the collar 37. The whey has a sufficient energy imparted to it such that it flows upwardly along hood 60 and into the flow channel 61 from where it passes out of the spout 62 into suitable collecting means.

After the bulk of the whey has been separated from the curd during an initial period of rapid rotation, the speed of the centrifuge may be slowed down to approximately 12 R. P. M., at which speed the curd will just be held against the outer wall of the centrifuge by its rotation. Separation of the whey from the curd continues at a slower rate until completion of the curd-separating operation. When the final stage of whey separation is performed in this manner, the whey can be eliminated from the curd with just the proper application of energy such that this final whey separation is the equivalent of the previously required cheddaring operation and is operative to produce a curd having just the proper moisture content, texture, and properties to effect the matting of the curd.

Figure 6:
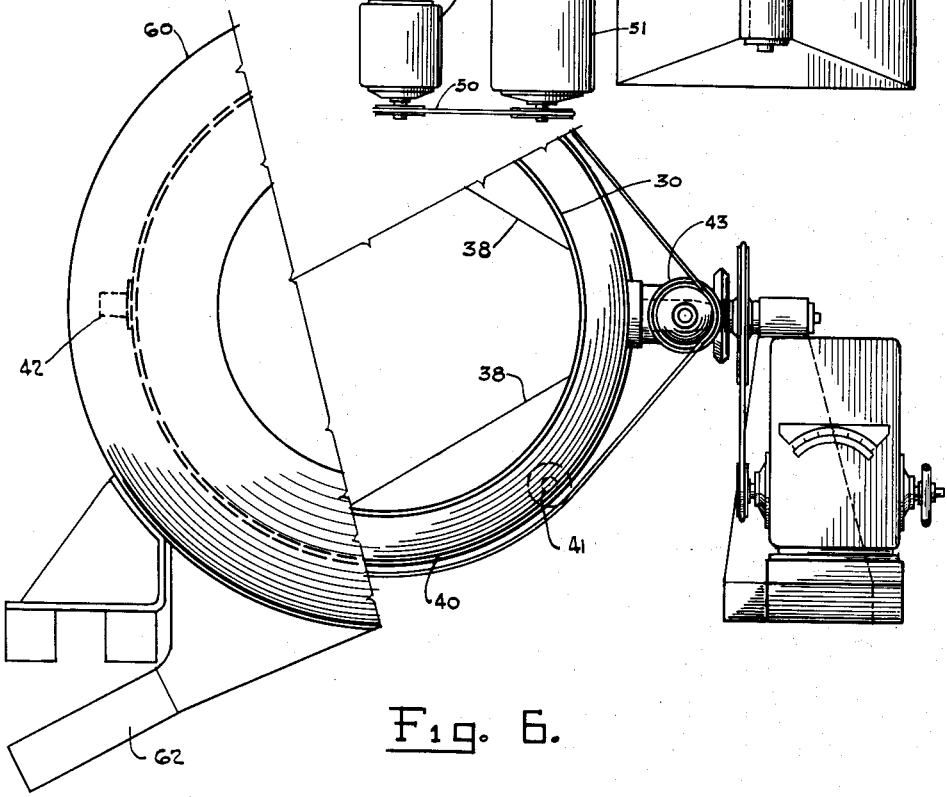
Figure 6 is a front end elevation partly broken away showing the centrifuge of Figure 5.

In an alternate form of the construction of the centrifuge, the basket may be provided with flat sections 38 around the side wall, as best shown in Figures 3 and 6, against which the curd lies during the centrifuging operation. After the centrifugal separation of the whey from the curd has ben substantially completed, the speed of rotation of the basket may be reduced until the curd slabs formed on each of the flat sections 38 fall downwardly. The basket 30 may then be driven to rotate very slowly, and the curd slabs are turned regularly to complete the curd matting or the cheddaring operation wherein the additional portion of the whey is more slowly separated from the curds.

After the curd and the whey have been separated in the centrifuge and the cheddaring or its equivalent performed, the basket is turned so that the curd falls downwardly out of its mouth into a suitable grinder or mill 70 which is best shown in Figure 2 and which cuts the curd into relatively small sizes of about ½ inch to 1 inch average diameter and 2 inches to 3 inches long. Salt is continuously added to the cut curd from the measuring feed 71, and the curd and the salt are delivered to suitable forking or stirring means which are contained in the mixer 72. The agitating means may take the form of paddles or blades 73 which extend outwardly from a rotating axle 74, and the blades 73 may be turned with respect to the axle to form a somewhat screw thread arrangement to complete the mixing while simultaneously delivering the salted curd to the outlet spout 75 of the mixer. A valve may be provided in the spout or a reversible drive mechanism provided to rotate the axle 74. When the axle is rotated in one direction, the salted curd may be simultaneously mixed and forced through the mixer and out of spout 75, whereas when the knives are rotated in the opposite direction, the curd is delivered backwardly in the mixer so that the spout is effectively sealed off. The operation of this type of mixer, first in one direction and then in the other, not only serves to act as a valve in delivering the salted curd out of the spout but also has been found to accomplish a much more thorough agitation and mixing of the salt and the curd.

The salted curd is delivered from the spout 75 through a funnel 76 and into a suitable preheated hoop 77 which may be lined with cheesecloth, if desired. After the hoop has been filled, it is carried by a conveyor 78 to a compressing station where a power driven plunger 79 engages against the curd to compact it with the proper force, for example, a pressure within the range of about 40 to 400 pounds per square inch, and the hooping operation is completed. The hooped curd is then allowed to stand for a sufficient period of time, for example, about 1 to 6 hours, to produce a permanent knitting of the curd. After a permanent set has resulted, the hoop or hoop and cloth are stripped from the molded curd; and after development of a suitable rind, the green cheese is coated with paraffin and is delivered, by conventional or automatic conveying and handling means, to suitable aging and curing rooms.

An alternate form of a machine to perform this invention is shown in Figures 2 and 3, and in this form of the invention a single stationary vat 80 is provided to receive the milk which is to be treated to produce a curd. The vat 80 may be filled from any suitable source, and the cover 81 may be lowered to close the tank while the mixing of the rennin, heating of the milk, and production of suitable lactic acid are accomplished. After the cogulating agents have been dispersed therein, the milk is permitted to stand while the curd develops. When the milk has set, a curd-cutting knife, like that described and shown in connection with Figure 4, is lowered into the vat 80, and the curd is cut in the fashion described in connection with tank 23. The cut curd is then cooked in vat 80 and may be gently stirred by a slow turning movement of the curd-cutting knife, the curd being simultaneously warmed by the circulation of a heating fluid in a heating jacket 82 which surrounds the tank 80. After the curd has been cooked, a portion of the curd may be delivered from vat 80 through the conduit 83 into the centrifuge 30, whereupon the curd may be processed as described above to separate the whey. In this form of the machine the centrifuge 30 may have a capacity sufficient to handle about one-half of the batch of curd developed in the vat 80, and the remaining curd may be either stored in vat 80 or delivered to a second centrifuge so that curd can be substantially continuously processed in accordance with the teaching of this invention. After separation, the curd may be ground and salted as described above.

In each of the above-described curd-handling means, the centrifuge has been utilized to effect the cheddaring of the curd. For certain purposes, it may be desirable to use a different kind of an apparatus for this purpose such as finds embodiment in a continuously acting centrifuge 90 which cooperates with a moving conveyor belt 91 to carry the curd away. The centrifuge in this instance rotates about a substantially vertical axis, and the basket 92 has perforated side walls that flare outwardly from the bottom wall. The cut or diced and cooked curd and whey are delivered into the bottom of the rotating centrifuge and flow to the outside wall, the whey passing through the perforation while the curds are retained on the wall. As succeeding quantities of curd are delivered to the centrifuge, the outwardly flared wall of the basket becomes covered with a curd layer until finally, as more curd is dumped into the bottom, the curd at the top of the wall is pushed out of the rotating basket by the movement of the new curd across the bottom of the basket out to the side wall. The overflowing curd is then collected on a rotating table 93 that preferably takes the form of a ring surrounding the upper edge of the basket and moving at a rate of about one-half the R. P. M. of the basket.

The curd that collects on the table can be removed by a suitable plow 94 and then is delivered to the endless conveyor 91. The curd is compressed to a uniform thickness and is cut into slabs by the reciprocating presser 95 and knife 96, and as the slabs are carried along on the conveyor, plows 97 and 98 are disposed along the length thereof to engage the curd slabs to turn them over several times. The slabs are processed in the manner to complete the cheddaring operation and then the slabs of matted curds may be delivered from the end of conveyor 91 to the milling and salting means described above.

It is also readily apparent that means may be devised for mechanically setting the hoops on the pressed cheeses at the pressing station whereby the pressure produced by plunger 79 can be retained as long as desired so that the filled hoops can be rapidly treated as they flow from the filling spout 76. Thus, a metal hoop may be used having a spring pressed cap which may be initially set and thereafter retains an established pressure on the curds. Also, mechanical means may be provided for releasing the cap and stripping the hoop from the molded cheese if such means are desired.

While this invention has been described in connection with the manufacture of cheddar cheese, it is obvious that it may be used in all cheese processes where the whey is to be separated from the curd. By various modifications of the described procedure, by the addition of different types of cheese inoculants, and by the degree of whey separation, the production of various types of cheeses can be accomplished. Thus, many modifications of this invention will occur to those skilled in the art which will fall within the scope of the following claims.

We claim:

1. A device for separating the whey from a whey and milk curd mixture and for cheddaring the curd, said device including a frame, a basket mounted in said frame for rotation about an axis, the interior of said basket having a plurality of generally straight walls in the interior thereof, said walls being positioned generally tangential to a circle circumscribed about said axis, and power means connected to said basket to rotate said basket about said axis.

2. A device for separating the whey from a whey and milk curd mixture and for cheddaring the curd, said device including a frame, a ring pivotally mounted in said frame, means to control the position of the ring with respect to said frame, a basket mounted in said ring for movement about an axis, the interior of said basket having a plurality of generally straight walls in the interior thereof, said walls being positioned generally tangential to a circle circumscribed about said axis, and power means connected to said basket to rotate said basket about said axis.

3. A device for separating the whey from a whey and milk curd mixture and for cheddaring the curd, said device including a frame, a ring having a pair of extending shafts journaled in said frame, means to control the position of the ring with respect to said frame, a basket rotatably mounted in said ring for movement about an axis, the interior of said basket having a plurality of generally straight walls in the interior thereof, said walls being positioned generally tangential to a circle circumscribed about said axis, a first gear mounted for rotation about one of said shafts, variable speed power means connected to said first gear to rotate said gear about said one shaft, a second gear engaging said first gear, said second gear being supported by said ring to move therewith, and basket driving means interconnecting said second gear and said basket to rotate said basket in response to the rotation of said second gear.

4. A device for separating the whey from a whey and milk curd mixture and for cheddaring the curd, said device including a frame, a ring having a pair of extending shafts journaled in said frame, means to control the position of the ring with respect to said frame, a basket rotatably supported and mounted in said ring and adapted to contain said mixture for movement about an axis, said basket having a mouth, a first gear mounted for rotation about one of said shafts, power means connected to said first gear to rotate said gear about said one shaft, a second gear engaging said first gear, said second gear being supported by said ring to move therewith, and basket driving means interconnecting said second gear and said basket to rotate said basket in response to the rotation of said second gear, whereby said basket may be positioned with the mouth upwardly for filling, may be rotated about said axis to separate the whey and the curd, and may be turned with the mouth downwardly to empty the separated curd.

5. A device for separating the whey from a whey and milk curd mixture and for cheddaring the curd, said device including a frame, a basket mounted in said frame for rotation about an axis, the interior of said basket having a plurality of generally straight walls in the interior thereof, said walls being positioned generally tangential to a circle circumscribed about said axis, and variable speed power means connected to said basket to rotate said basket about said axis.

6. The method of operating a centrifuge to separate the whey from a whey and milk curd mixture contained therein and for cheddaring the curd including the steps of rotating the whey and curd mixture at high speed in the centrifuge to separate the majority of the whey from the curd, removing said separated whey from contact with the curd, with the curd remaining on the walls of the centrifuge, reducing the speed of rotation of the separated curd in the centrifuge and continuing its rotation for a period of time sufficient to cheddar the curd.

7. Apparatus for cheddaring blocks of milk curds including a conveyor, power means connected to said conveyor to move said blocks along said conveyor in a given path in a given direction, and a plurality of plows disposed along the length of said conveyor at spaced points in said path, said plows facing said blocks moving in said direction with an entering edge of the plow immediately above said conveyor to engage under said slabs as they are moved in said direction to flop the blocks over to effect a cheddaring thereof.

References Cited in the file of this patent

UNITED STATES PATENTS

| | | |
|---|---|---|
| 112,112 | Block | Feb. 28, 1871 |
| 526,165 | Salenius | Sept. 18, 1894 |
| 1,475,398 | Kielsmeir | Nov. 27, 1923 |
| 2,165,005 | Petersen | July 4, 1939 |
| 2,387,276 | Link | Oct. 23, 1945 |
| 2,415,239 | Flowers et al. | Feb. 4, 1947 |
| 2,544,672 | Greer et al | Mar. 13, 1951 |

FOREIGN PATENTS

| | | |
|---|---|---|
| 124,467 | Australia | June 4, 1947 |